United States Patent Office 2,947,512
Patented Aug. 2, 1960

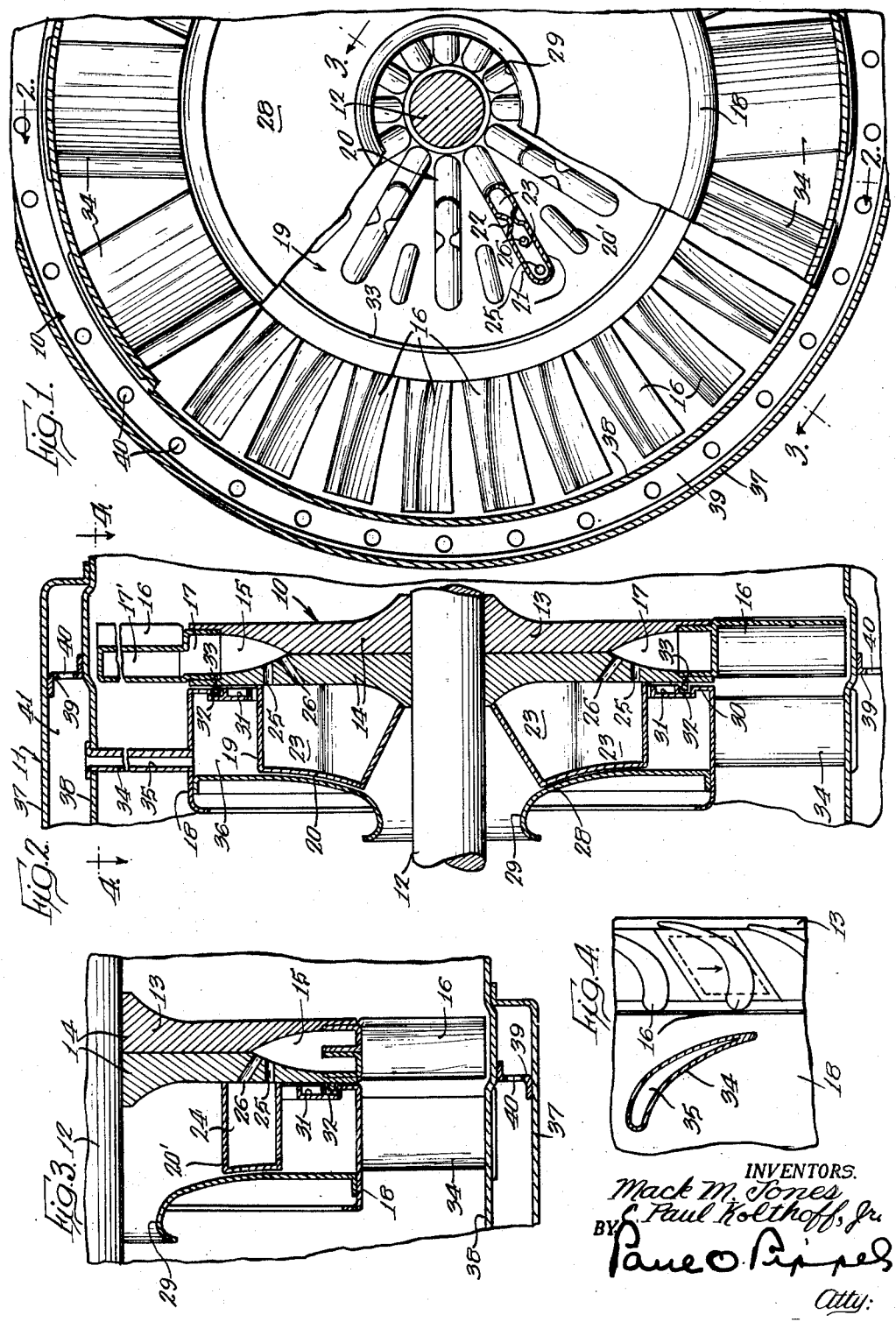

2,947,512

TURBINE BLADE AND NOZZLE BLADE COOLING CONSTRUCTION FOR GAS TURBINES

Mack M. Jones, Western Springs, and C. Paul Kolthoff, Jr., Naperville, Ill., assignors to International Harvester Company, a corporation of New Jersey Filed Dec. 19, 1956, Ser. No. 629,315

9 Claims. (Cl. 253—39.15)

This invention relates to gas turbine engines. More specifically the invention relates to an improved construction for cooling the nozzle blades and turbine blades of a gas turbine engine.

In the field of gas turbines it is well known that turbine blade and nozzle blade maintenance presents an extremely vital problem. The extreme high temperatures to which the blades are subjected causes short blade life and results in frequent maintenance. Such high temperatures are a result of the hot gases which engage the nozzle and turbine blades for driving the turbine rotors. Various attempts have been made to solve this problem, among which are the utilization of certain high temperatures resistant alloys. Such alloys are of course extremely expensive and in many instances their use does not entirely dissipate the temperature problems encountered. It is a prime object of this invention, therefore, to provide an improved construction for the cooling of nozzle and turbine blades of a gas turbine.

Still another object is to provide an improved liquid cooling means for cooling the turbine blades of a gas turbine rotor.

A still further object is to provide an improved gas turbine construction including a novel means for cooling the turbine blades and for also simultaneously providing for the cooling of the nozzle blades positioned adjacent the turbine rotor.

A still further object is the provision of an improved cooling means for cooling the blades of a gas turbine rotor, the said cooling means embodying a cooling liquid adapted to be directed through the hollow turbine blades, the said construction also including a fan adapted to rotate and direct cooling air through the nozzle blades of the gas turbine.

These and other objects will become more readily apparent from a reading of the specification when examined in connection with the accompanying sheet of drawing.

Figure 1 is a front elevational view, with portions broken away, showing a portion of a gas turbine engine;

Figure 2 is a cross sectional view through the gas turbine engine taken substantially along the line 2—2 of Figure 1;

Figure 3 is a cross sectional view showing a half portion of the gas turbine, the said view being taken along the line 3—3 of Figure 1; and Figure 4 is a fragmentary sectional view taken substantially along the line 4—4 of Figure 2.

Referring now particularly to Figures 1 and 2, a gas turbine engine is generally designated by the reference character 10. The gas turbine engine 10 comprises a cylindrical housing 11 in which a shaft 12 is mounted for rotation. The shaft 12 is suitably connected for rotation to a turbine rotor 13. The shaft 12 extends rearwardly and is connected to rotate a compressor wheel (not shown) for suppling air under pressure to suitable combustors which in turn direct hot gases into engagement with turbine blades for driving the rotor 13. The turbine rotor 13 consists of half portions 14 suitably connected together, the said half portions 14 being suitably formed at their outer peripheral ends to provide an annular recess or chamber 15. A plurality of circumferentially spaced turbine blades 16 are suitably connected to the peripheral edges of the half portions 14, each of the said turbine blades 16 being provided with a hollow portion or chamber 17.

A fan housing 18 is positioned adjacent the turbine rotor 13. The fan housing 18 encircles a fan 19 comprising a plurality of fan blades 20. The fan blades 20 include laterally spaced walls 21 which are suitably crimped at 22 to provide a pair of hollow portions or chambers 23. A relatively smaller fan blade 20′, as indicated in Figure 1, is circumferentially spaced between each of the fan blades 20. The fan blades 20′ are also of double wall construction, and as best indicated in Figure 3, are provided with a hollow portion or chamber 24. As best shown in Figure 2, the rotor 13 is provided with suitable liquid ports or passages 25 and vapor ports or passages 26 which are positioned in circumferentially spaced relation to communicate with the chambers 23 and 24. The fan casing or housing 18 includes an annular wall 28 provided with a suitable inlet opening 29. The casing 18 also includes an annular rear wall 30 provided with a pair of annular grooves 31 and 32. The rear wall 30 is suitably spaced from the rotor 13 so that the same can rotate freely with respect to the fan housing 18. A sealing ring 33 of any suitable material is secured to the rotor 13 for rotation therewith. The sealing ring 33 engages the groove 32 and with the groove 31 provides a labyrinth seal thereby sealing a portion of the fan housing 18. A plurality of nozzle blades 34, particularly well shown in Figure 4, are suitably connected to the fan housing 18, as indicated in Figure 2, and are in communication with a space or plenum chamber 36 provided within the fan housing 18. The nozzle blades 34 are of hollow construction to provide passages 35, best shown in Figures 2 and 4.

The housing 11 comprises an outer wall 37 and an inner cylindrical wall 38. The walls 37 and 38 extend longitudinally in overlapping relation with respect to the turbine blades and rotor as indicated in Figure 2. An annular spacer 39 is suitably secured to the walls 37 and 38 to maintain the same in spaced relation, the said spacer including a plurality of circumferentially spaced openings 40, only one of which is shown. The spaced walls 37 and 38 provide an annular chamber 41.

In the operation of the gas turbine shown, combustors direct the hot gases through the nozzle blades 34 whereupon they are directed to the turbine blades 16 for effectuating rotating driving movement of the rotor 13. The spaces or chambers 23 and 24 of the fan blades contain a suitable liquid which is directed to the recess 15 by means of the liquid ports 25. The ports or passages 25 may be considered primarily for the transmission of liquid whereas the ports or passages 26 might be considered primarily for the passage of vapor. The liquid in the chambers 23 and 24 is moved outwardly through the chamber 15 and into the hollow turbine blades, each of said blades, in effect, having an individual chamber 17′. The high temperatures of the gases against the turbine blades 16 causes the cooling liquid to boil and vaporize whereupon the vapor is forced downwardly through the chamber 17 through the passages 26 back into the fan chambers 23 and 24. Since cool air enters into the inlet 29, air is moved by the fan blades in a manner wherein the fan blades are cooled and thereupon the vapor within the chambers 23 and 24 is condensed back into liquid form. The cycle again is then repeated during the continuous operation of the gas turbine engine and thus coolant liquid is constantly being directed to the turbine blades for cooling the same.

The discharge of air from the fan 20, through the plenum chamber 35 passes through the passages or chambers 35 of the nozzle blades 34. The temperature of the air thus discharged from the fan housing 18 is considerably below the temperature of the gases which are directed against the nozzle blades 34 and thus a constant flow of cooler air is directed through the nozzle blades for providing cooling of the same. Thus the nozzle blades are effectively cooled and they are thus able to withstand the high temperatures occasioned by the hot gases which are directed through the said blades. The air passing through the passages 35 is transmitted to the chamber 41. The air coursing through the opening 40 into the rearward portion of the housing 11 also serves to sufficiently cool the said housing to prevent the possibility of expansion of the metal portions adjacent the turbine blades which might cause interference during rotation of the rotor.

Thus it is obvious an improved construction for cooling the turbine blades and the nozzle blades of a gas turbine engine has been described. It is apparent that the objects of the invention have been fully achieved and that one of the basic gas turbine problems has been solved. It must of course be realized that various cooling liquids may be utilized and that changes may be made without departing from the spirit of the invention or the scope thereof as defined in the appended claims.

What is claimed is:

1. A gas turbine comprising a turbine rotor, a plurality of radially extending turbine blades on said rotor, each of said blades including a hollow portion, an annular first chamber disposed about the outer peripheral edge of said rotor, said first chamber communicating with the hollow portion of the turbine blades, a cylindrical housing encircling said rotor, said housing including an annular second chamber, a cylindrical fan housing disposed within said cylindrical housing, said fan housing having an air inlet, a plurality of hollow nozzle blades connected to said fan housing and to said cylindrical housing and communicating with said second chamber, a third annular chamber 23 within said fan housing communicating with said hollow nozzle blades, a fan disposed within said housing and connected to said turbine rotor for rotation therewith, a plurality of radially extending and relatively circumferentially spaced hollow fan blades on said fan, said third chamber communicating with the spaces between said fan blades, said fan blades including outer ends spaced radially inwardly from said annular first chamber, said rotor having ports adjacent said outer ends of said fan blades and communicating with the fan blades and the first chamber, and a liquid within the hollow portions of said turbine blades, said liquid being vaporized by heated gases directed against the turbine blades, the vapor traveling to said hollow fan blades being condensed during rotation of the fan, the resultant liquid being centrifugally returned to said turbine blades, the air being moved by said fan being discharged to said third chamber and through said nozzle blades for cooling the same.

2. A gas turbine comprising a turbine rotor, a plurality of radially extending turbine blades on said rotor, each of said blades including a hollow portion, an annular first chamber disposed about the outer peripheral edge of said rotor, said first chamber communicating with the hollow portion of the turbine blades, a cylindrical housing encircling said rotor, said housing including an annular second chamber, a fan housing disposed within said cylindrical housing, said fan housing having an air inlet, a plurality of radially extending hollow nozzle blades connected to said fan housing and to said cylindrical housing and communicating with said second chamber, a third annular chamber within said fan housing communicating with said hollow nozzle blades, a fan disposed within said housing for rotation, a plurality of hollow radially extending relatively circumferentially spaced fan blades on said fan, said third chamber communicating with the spaces between said fan blades, said fan blades having outer ends spaced radially inwardly from said first chamber, said rotor having ports adjacent said outer ends of said fan blades and communicating with the fan blades and the first chamber, a liquid within the hollow portions of said turbine blades, said liquid being vaporized by heated gases directed against the turbine blades, the vapor traveling to said hollow fan blades being condensed during rotation of the fan, the resultant liquid being centrifugally returned to said turbine blades, the air being moved by said fan being discharged to said third chamber and through said nozzle blades for cooling the same.

3. A gas turbine comprising a turbine rotor, a plurality of radially extending turbine blades on said rotor, said turbine blades having hollow portions, a cylindrical housing encircling said rotor, said housing having an annular chamber, a fan casing disposed within said cylindrical housing, said casing having an air inlet, a plurality of radially extending hollow nozzle blades connected to said housing and casing, said blades having openings communicating with the annular chamber and the interior of said casing, a fan disposed within said casing, said fan including a plurality of radially extending relatively circumferentially spaced fan blades, said fan blades having outer ends disposed radially inwardly of said hollow portions, the casing being in communication with the spaces between said fan blades, said fan blades each having hollow portions, said rotor having passages communicating with hollow portions of the fan blades adjacent said outer ends and communicating with said hollow portions of the turbine blades, and a liquid within the hollow portions of said turbine blades, the said liquid being vaporized by heated gases directed through said nozzle blades against said turbine blades, whereby the vapor is directed to said fan blades, condensed to liquid, and said liquid is returned to said turbine blade by centrifugal force, the air from said fan being discharged through said nozzle blades to said annular chamber.

4. A gas turbine comprising a turbine rotor, a plurality of radially extending turbine blades on said rotor, said turbine blades having hollow portions, a cylindrical housing encircling said rotor, said housing having an annular chamber, a fan casing disposed within said cylindrical housing, said fan casing having a smaller diameter than said turbine rotor and blades, said casing having an air inlet, a plurality of radially extending hollow nozzle blades connected to said housing and casing, said blades having openings communicating with the annular chamber and the interior of said casing, a fan disposed within said casing and connected to said rotor for rotation therewith, said fan including a plurality of radially extending relatively circumferentially spaced fan blades, the casing communicating with the spaces between said fan blades, said fan blades having outer ends spaced radially inwardly from said hollow portions, said fan blades each having hollow portions, said rotor having passages communicating with said hollow portions of the fan blades adjacent said outer ends and communicating with said hollow portions of the turbine blades, and a liquid within the hollow portions of the turbine blades, the said liquid being vaporized by heated gases directed through said nozzle blades against said turbine blades, whereby the vapor is directed to said fan blades, condensed to liquid, and said liquid is returned to said turbine blades by centrifugal force, the air from said fan being discharged through said nozzle blades to said annular chamber.

5. A gas turbine comprising a turbine rotor, a plurality of radially extending turbine blades on said rotor, said turbine blades having hollow portions, a housing around said rotor, said housing having an annular chamber, a fan casing disposed within said cylindrical housing, said casing having an air inlet, a plurality of hollow nozzle blades connected to said housing and casing, said blades having openings communicating with the annular chamber and the interior of said casing, a rotatable fan disposed within said casing, said fan including a plurality of radially extending relatively circumferentially spaced fan blades, said casing communicating with the spaces between said fan blades, said fan blades having outer ends spaced radially inwardly from said hollow portions, said fan blades each having hollow portions, said rotor having passages communicating with the hollow portions of the fan blades adjacent said outer ends and communicating with the hollow portions of the turbine blades, and a liquid within the hollow portions of the turbine blades, the said liquid being vaporized by heated gases directed through said nozzle blades against said turbine blades, whereby the vapor is directed to said fan blades, condensed to liquid, and said liquid is returned to said turbine blade by centrifugal force, the air from said fan being discharged through said nozzles blades to said annular chamber.

6. A gas turbine comprising a turbine rotor having a plurality of radially extending hollow blades including a heat transfer liquid, a housing around said turbine rotor, a fan casing within said housing, a fan rotatably mounted in said casing, said casing having an air inlet, a plurality of hollow radially extending relatively circumferentially spaced fan blades on said fan, said fan blades having outer ends spaced radially inwardly from said turbine rotor blades, said casing communicating with the spaces between said fan blades, and a plurality of hollow nozzle blades connected to and communicating with said fan casing and connected to said housing and being in horizontally adjacent relation with said turbine blades, said rotor including a passage communicating with said hollow fan blades adjacent said outer ends and said hollow turbine blades, said hollow portions of said turbine blades having a liquid therein, whereby said liquid in said turbine blades may be vaporized and the vapor is directed to said fan blades for condensation and returned as liquid to said turbine blades and the air discharge from said fan is directed to said hollow nozzle blades.

7. A gas turbine comprising a turbine rotor having a plurality of radially extending hollow blades, including a heat transfer liquid, a fan casing adjacent said rotor, a fan rotatably mounted in said casing, said casing having an air inlet, a plurality of hollow radially extending relatively circumferentially spaced fan blades on said fan, said fan blades having outer ends spaced radially inwardly from said hollow turbine blades, said casing communicating with the spaces between said fan blades, and a plurality of hollow nozzle blades connected to and communicating with said fan casing and being in horizontally adjacent relation with said turbine blades, said rotor including a passage communicating with said hollow fan blades adjacent said outer ends and said hollow turbine blades whereby liquid in said turbine blades may be vaporized and the vapor is directed to said fan blades for condensation and returned as liquid to said turbine blades and the air discharge from said fan is directed to said hollow nozzle blades.

8. A gas turbine comprising a turbine rotor having a plurality of radially extending hollow blades containing a heat transfer liquid, a fan casing adjacent said rotor, a fan rotatably mounted in said casing, said casing having an air inlet, a plurality of hollow radially extending relatively circumferentially spaced fan blades on said fan, said fan blades having outer ends spaced radially inwardly from said hollow turbine blades, said casing communicating with the space between said fan blades, and a plurality of hollow nozzle blades connected to and communicating with said fan casing and being in horizontally adjacent relation with said turbine blades, said rotor including means providing for communicating with said hollow fan blades adjacent said outer ends, and said hollow turbine blades whereby liquid in said turbine blades may be vaporized and the vapor is directed to said fan blades for condensation and returned as liquid to said turbine blades and the air discharge from said fan is directed to said hollow nozzle blades.

9. A gas turbine comprising a turbine rotor having a plurality of radially extending hollow blades containing a heat transfer liquid, a fan casing adjacent said rotor, a fan rotatably mounted in said casing, said casing having an air inlet, and a plurality of hollow radially extending relatively circumferentially spaced fan blades on said fan, said fan blades having outer ends spaced inwardly from said hollow turbine blade, said casing communicating with the spacing between said fan blades, a plurality of nozzle blades connected to said fan casing and being in horizontally adjacent relation with said turbine blades, said rotor including means providing for communicating with said fan blades adjacent said outer ends and said turbine blades whereby said liquid in said turbine blades may be vaporized and the vapor is directed to said fan blades for condensation and returned as liquid to said turbine blades and the air discharge from said fan is directed to cool said nozzle blades.

References Cited in the file of this patent

UNITED STATES PATENTS 2,782,000    Ledinegg    Feb. 19, 1957

FOREIGN PATENTS 478,970    France    Nov. 2, 1915
682,469    Great Britain    Nov. 12, 1952
696,062    Germany    Sept. 10, 1940